(No Model.)

C. J. LINDQUIST.
DEHORNING IMPLEMENT.

No. 587,589.  Patented Aug. 3, 1897.

Witnesses
Ralph E Bates
J. A. Wilson

Inventor
C. J. Lindquist
by H. B. Wilson
Attorney

UNITED STATES PATENT OFFICE.

CHARLES J. LINDQUIST, OF WEBSTER, SOUTH DAKOTA.

DEHORNING IMPLEMENT.

SPECIFICATION forming part of Letters Patent No. 587,589, dated August 3, 1897.

Application filed April 19, 1897. Serial No. 632,897. (No model.)

*To all whom it may concern:*

Be it known that I, CHARLES J. LINDQUIST, a citizen of the United States, residing at Webster, in the county of Day and State of South Dakota, have invented certain new and useful Improvements in Dehorners; and I do declare the following to be a full, clear, and exact description of the invention, such as will enable others skilled in the art to which it appertains to make and use the same.

My invention has relation to improvements in implements for dehorning cattle, and the object is to provide a handy, simple, and effective device for this purpose.

To this end the novelty consists in the construction, combination, and arrangement of the several parts of the same, as will be hereinafter more fully described, and particularly pointed out in the claims.

In the accompanying drawings the same reference-characters indicate the same parts of the invention.

Figure 1:
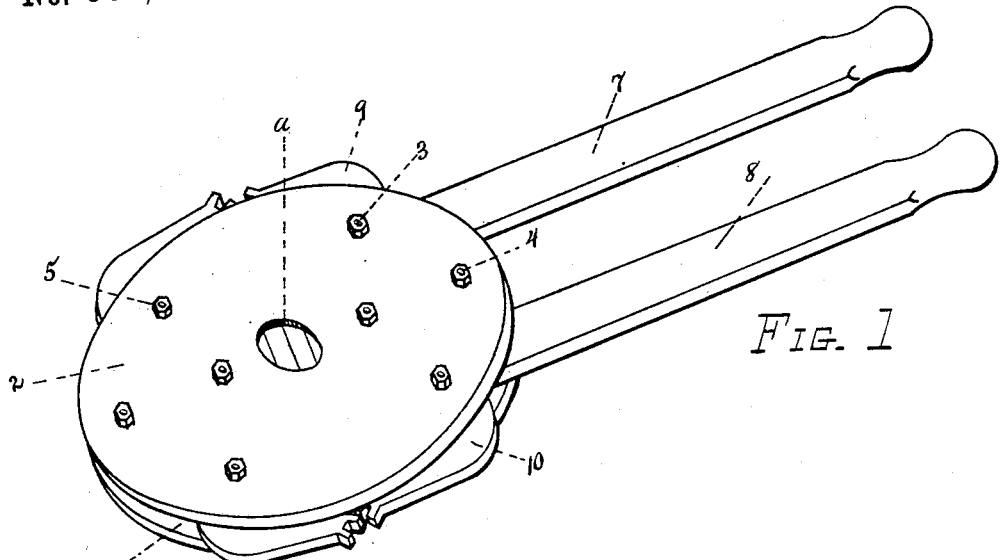
Figure 2:
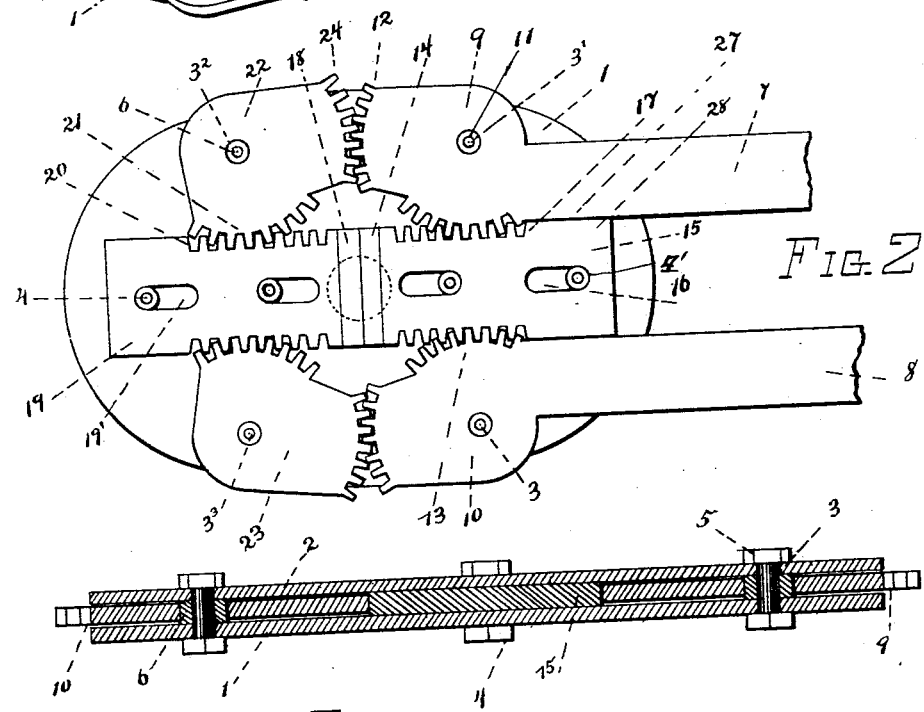
Figure 3:
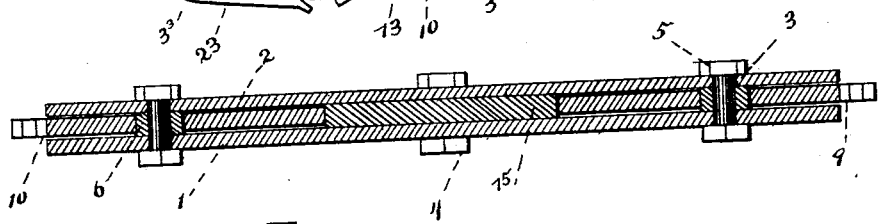

Figure 1 is a perspective view of my improved dehorner. Fig. 2 is a plan view of the same with the top plate removed; and Fig. 3 is an enlarged vertical section through one of the bolts, sleeves, and levers.

1 represents the bottom and 2 the top plate, which form the frame, these plates being provided with central alined orifices $a$ $a$ and are secured together parallel with each other by the pivot-bolts 3 3' $3^2$ $3^3$ and the guide-bolts 4 4 and 4' 4', all of which are provided with the usual nuts 5 5.

6 6 represent a series of sleeves encompassing the body portion of each of the above-mentioned bolts between the plates 1 and 2.

7 and 8 represent parallel levers, the heads 9 and 10, respectively, of which are provided with a transverse circular orifice 11, through which they are fulcrumed on the sleeves on the bolts 3 3'. The outer curved ends of these levers 7 and 8 are provided with a series of teeth 12 12 and their inner contiguous faces with a series of similar teeth 13, the teeth 13 being arranged relatively at a right angle to the teeth 12 on each lever-head and the teeth 12 located at a greater distance from the fulcrum center than the teeth 13 on the same head.

14 represents a longitudinally-reciprocating cutter, the shank 15 of which is parallel with two alined guide-slots 16 16, which engage the sleeves on the guide-bolts 4 4, and the opposite parallel edges of the shank are formed with a series of rack-teeth 17, which mesh with the corresponding teeth 13 on the levers 7 and 8. 18 represents a similar oppositely-disposed longitudinally-reciprocating cutter, the shank 19 of which is also provided with two alined guide-slots 19', which engage the sleeves on the guide-bolts 4' 4', and the opposite parallel edges of said shank are formed with a series of rack-teeth 20, which mesh with the corresponding teeth 21 on the mutilated quadrantal gears 22 23, fulcrumed on the sleeves on the pivot-bolts $3^2$ $3^3$, respectively. These mutilated quadrantal gears 22 23 are each provided with a second series of teeth 24, arranged in the same plane at an approximate right angle to and at a greater distance from the fulcrum-point than the first-mentioned teeth 21, and they mesh with the corresponding teeth 12 on the contiguous edges of the levers 7 and 8.

From this description, taken in connection with the construction illustrated in the drawings, it will be seen that when the levers 7 and 8 are pressed apart the cutters 14 and 18 are caused to recede, and when said levers are brought together the said cutters approach each other, traversing the openings $a$ $a$ from opposite directions until the heels 27 of the levers abut against the opposite parallel plane edges 28 of the shank 15 of the cutter 14, which is the limit of movement, and when this is accomplished the contiguous parallel edges of the cutters are sufficiently close without actually coming in contact to effectually sever an article placed between them.

By referring to Fig. 3 it will be noticed that the sleeve is a trifle longer than the thickness of the lever, and consequently when the plates 1 and 2 are rigidly drawn together by the bolt and nut they bind on the ends of the sleeve, leaving the lever perfect freedom of movement between the contiguous inner faces of said plates.

In using my improved dehorner the lever-handles are separated to withdraw the cutter-blades and leave an unobstructed passage through the orifices in the plates 1 and 2. The implement is then adjusted so that the horn projects through the central orifice, and the lever-handles are then forced together, causing the cutter-blades to approach each other and sever the horn from the head.

The device is very simple, effective, and easily operated, and by reference to Fig. 2 it will be seen that the cutter-blades can be readily removed for sharpening and replaced very conveniently.

Although I have specifically described the construction and relative arrangement of the several elements of my invention, I do not desire to be confined to the same, as such changes or modifications may be made as clearly fall within the scope of my invention without departing from the spirit thereof.

Having thus fully described my invention, what I claim as new, and desire to secure by Letters Patent, is—

1. In a dehorner, the combination with the operating-levers having heads provided with teeth on their adjacent edges and on their ends, of cutters the sides of which are provided with teeth, quadrantal gears each provided with two sets of teeth, the teeth on the sides of one cutter meshing with the teeth on the adjacent sides of the lever-head, and the teeth on the sides of the other cutter meshing with one set of teeth of the quadrantal gears, while the other set of teeth of the quadrantal gears mesh with the teeth at the ends of the lever-heads, substantially as shown and described.

2. A dehorner comprising the parallel plates 1 and 2, provided with the central alined orifices $a$ $a$, a series of guide-bolts and pivot-bolts having encompassing sleeves 6, and adapted to secure said plates together, in combination with the longitudinally-reciprocating cutters 14 and 18, having alined guide-slots engaging the sleeves on the guide-bolts, and having their opposite parallel edges formed with a series of rack-teeth 17 20, a pair of lever-handles 7 and 8, the integral heads 9 and 10 which are fulcrumed on the sleeves encompassing the pivot-bolts 3 3' respectively, their contiguous edges being provided with a series of teeth 13 meshing with the rack-teeth on the cutter 14, and having their outer curved ends formed with a series of teeth 12 arranged at a greater distance from the fulcrum-point than the teeth 13, and the mutilated quadrantal gears 22 23, fulcrumed on the sleeves on the pivot-bolts $3^2$ $3^3$ respectively, and provided with a series of teeth 21 meshing with the teeth 20 on the opposite parallel edges of the cutter 18, and a second series of teeth 24 arranged at an approximate right angle to, and at a greater distance from, the fulcrum-point than the first-mentioned teeth 21 and in mesh with the corresponding teeth 12 on the contiguous outer edges of the levers 7 and 8, substantially as shown and described.

In testimony whereof I hereunto affix my signature in presence of two witnesses.

CHARLES J. LINDQUIST.

Witnesses:
J. F. PITSOR,
J. J. COWAN.